May 22, 1962  R. HASWELL  3,036,218
A.C. FREQUENCY CHANGING MEANS
Filed July 1, 1957

United States Patent Office 3,036,218
Patented May 22, 1962

3,036,218
A.C. FREQUENCY CHANGING MEANS
Ronald Haswell, Newcastle-upon-Tyne, England, assignor to Sir Howard Grubb Parsons & Company Limited, Walkergate, England
Filed July 1, 1957, Ser. No. 669,082
Claims priority, application Great Britain July 27, 1956
3 Claims. (Cl. 250—218)

This invention relates to means for converting alternating currents from a low to a higher frequency.

In many types of process-control instruments an A.C. signal at a low frequency of the order of 10 c./s., and proportional to a quantity to be measured, is frequently obtained and hitherto it has been necessary to convert this alternating current into D.C. for the purpose of indicating and recording the quantity being measured.

Means for accomplishing this are well known to those versed in the art, but the ability to convert from the signal frequency to a higher value, say 50 c./s., would simplify the problem of smoothing the rectified current, or, alternatively, the unrectified current at 50 c./s. could be measured with any of several types of standard A.C. meter which are suitable for operation at 50 c./s. but not 10 c./s.

Frequently null-balance instruments are preferred to direct deflection types and then the problem is to use a low frequency out-of-balance signal to operate a self-balancing mechanism.

Since servo systems operating at 10 cycles per second are difficult to design the usual method adopted is to rectify the low frequency signal and then convert the D.C. signal to A.C. at mains frequency, the A.C. signal then produced being used to drive a servo-system.

A typical example of the null-balance system described is the self-balancing spectrometer in which radiation from a suitable source is switched a number of times a second alternately by way of two beam paths, one of which contains a sample under test and the other a comparison substance before entering an entrance slit of a monochromator.

In the monochromator selected wavelengths from each beam path are caused to impinge alternately on detection means. Any difference in energy between the two beams produces an A.C. signal of low frequency which is rectified and then converted to A.C. at mains frequency before being applied to one phase of a split phase induction motor, the other phase being supplied continuously from the mains. This motor is used to drive an attenuator in and out of the beam path containing the comparison substance until such time as the energy from each path is the same, in which case the A.C. signal from the detector ceases and the attenuator comes to a standstill, its final position being a measure of the difference in energy between the two paths.

This method suffers from the disadvantage that the rectified signal must be smoothed before being used further, and the smoothing circuits have the effect of introducing undesirable time lags which in some cases leads to instability.

The object of the present invention is to provide means for increasing the frequency of a signal representing a quantity to be measured.

The invention consists in a means for increasing the frequency of a first signal representing a quantity to be measured in which said first signal is used to modulate a second signal produced by an A.C. generator driven at a speed in fixed relationship to the frequency F of the source of supply from which said first signal is derived, the frequency $f_1$ of said second signal being adjusted in relation to the frequency $f_2$ of the first signal so that $f_1 \pm f_2 = F$, a selector circuit being provided to select, from the resultant modulated output, a signal of frequency equal to the supply frequency F.

The invention also consists in a double beam spectrometer comprising a source of radiation, means for directing said radiation into two beam paths one path containing a sample substance and the other path comparison means, means for focussing the radiations in each beam path alternately on the entrance slit of a monochromator, detection means for receiving radiations from said monochromator and converting same into an equivalent electrical signal said signal having a frequency $f_2$ equal to the frequency with which a beam is focussed on said entrance slit, amplification means for amplifying said signal from the detection means, a frequency step up circuit in which said signal from the amplifier is modulated with a signal from the A.C. generator having frequency $f_1$ such that $f_1 \pm f_2 = F$, a signal of frequency F being selected by said circuit and applied to a servo system for moving an attenuator in the beam path containing the comparison means.

The invention also consists in a double beam spectrometer as set forth in the preceding paragraph in which the servo system includes a split phase induction motor a reference phase of which is operated continuously from mains supply whilst a control phase is energised by the signal from said frequency step up circuit having a frequency F equal to mains frequency and the A.C. generator is adjusted so that the latter signal has a 90° phase displacement relative to the reference phase.

Referring to the accompanying diagrammatic drawings.

Figure 1:
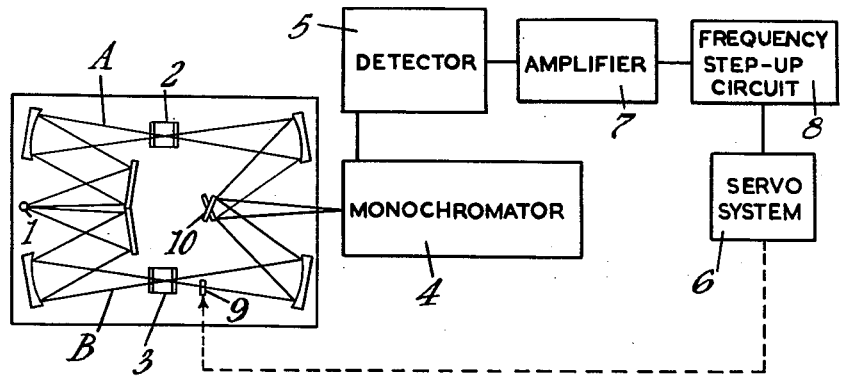
FIGURE 1 shows a double beam spectrometer arrangement using the null balance principle and incorporating a frequency step up circuit in accordance with the present invention.

In carrying the invention into effect in the form illustrated by way of example and referring first of all to FIGURE 1, a self-balancing double beam spectrometer comprises a source of radiation 1, two beam paths A, B for the radiation, one beam path (A) containing a sample 2 under test and the other (B) a comparison substance 3, a monochromator 4 for selecting given wavelengths received from each path and focussing said radiation on detection means 5, a servo system 6 operated from an electric signal derived from the detection means after passing through amplifier 7 and frequency step up circuit 8, the said servo system moving an attenuator 9 in the beam path B containing the comparison substance 3, and beam switching means 10 for focussing radiations from each path alternately on the entrance slit of the monochromator 4.

In one form of double beam spectrometer the switching means comprise a pair of reciprocating mirrors operated by an eccentric on a shaft in the manner described in No. 2,604,810 the shaft being driven at 750 r.p.m. thus switching the beams alternately at 12.5 cycles per second.

In operation, when the sample substance 2 is not being used the radiations from each beam path A and B falling on the detection means 5 are equal and no signal results. When the sample 2 is placed in path A, however, the radiant energy received from that path is reduced and any difference in energy between the two beam paths A and B produces an A.C. signal from the detection means 5, at a frequency $f_2$ of 12.5 cycles per second. This signal is then modified by the frequency step up circuit 8 to be described later and used to drive the servo system 6 which moves the attenuator 9 in the comparison beam B until such time as the energy in both beam paths A and B entering the detection means 5 is the same at which time the A.C. signal from the said means drops to zero.

The position of the attenuator 9 is then a measure of the radiation absorbed by the sample substance.

As can be seen, the signal frequency from the detection means 5 in such circumstances is low and in accordance with the present invention means 8 are provided for converting the signal to mains frequency before it is fed to the servo system 6.

Figure 2:
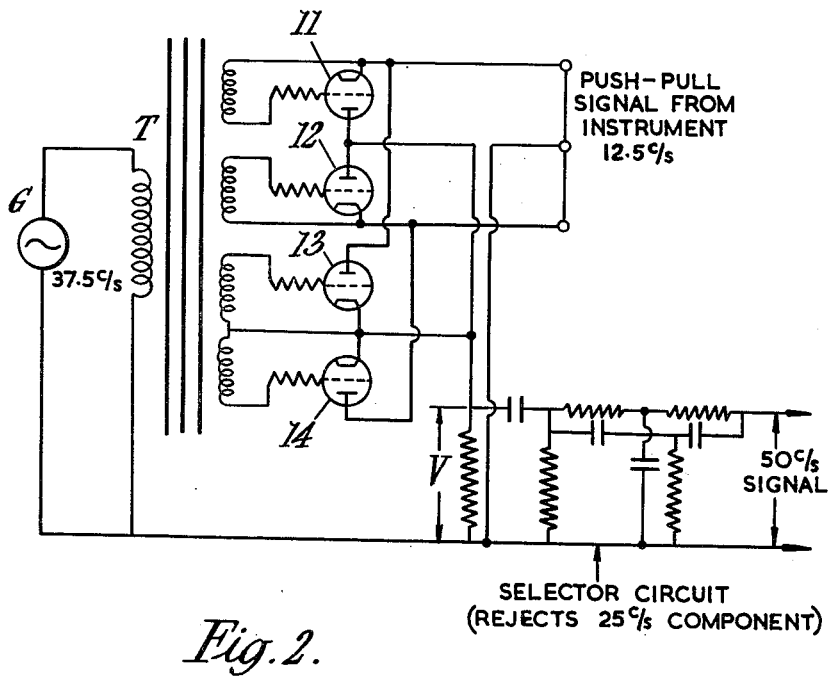
FIGURE 2 shows the frequency step-up circuit in detail.

FIGURE 2 of the accompanying diagrammatic drawings shows a preferred circuit arrangement for achieving this object. G is a small two pole A.C. generator of low moment of inertia which is geared to the rotating shaft of the reciprocating mirror system so as to rotate at 2250 r.p.m. This produces an alternating voltage of frequency $f_1 = 37.5$ cycles per second.

This voltage is fed via a transformer T to the grids of four modulator valves 11, 12, 13 and 14, the anodes of which are controlled by the low frequency signal from the detection means 5 after amplification.

If the voltage produced by the generator G is given by $E \sin w_1 t$ and the grid voltage is given by $$V_g = E \sin w_1 t$$

then the amplification factor A is a function of the low frequency signal $e \sin w_2 t$ from the detection means and can be represented by $$A = e \sin (w_2 t + \phi)$$

The angle $\phi$ may be adjusted to zero and the output V from the circuit is given by $$V = AV_g$$
$$= eE \sin w_1 t \cdot \sin w_2 t$$
$$= \frac{eE}{2}(\cos 2\pi(f_1 - f_2)t - \cos 2\pi(f_1 + f_2)t)$$

From the values of $f_1$ and $f_2$ given above it will be seen that the resultant signal has frequency components of 25 cycles per second and 50 cycles per second. By means of selector networks well known to those versed in the art and of the form shown in the drawing, the 25 cycles per second component can be rejected and the resulting 50 cycles per second component fed to the servo system 6 by way of a further amplifier if necessary.

Whilst in the sample quoted the frequencies $f_1$ and $f_2$ were 37.5 and 12.5 cycles per second respectively other values can be used. For any given frequency $f_2$, $f_1$ is adjusted so that $f_1 \pm f_2 = F$ the supply frequency. If F is mains frequency, 50 cycles per second in the United Kingdom, then the values are given by $$f_1 \pm f_2 = 50$$

Both the signals, i.e. the out of balance signal and the signal from the A.C. generator G must have the same parent frequency, in the above case mains frequency, in order that the phase relation of the resultant signal from the selector networks to the out of balance frequency shall remain constant.

In the spectrometer described above the phase of the signal from the A.C. generator is maintained in a fixed relationship with that of the out of balance signal and the phase difference can be preset to any desired value by rotating the body of the generator relative to its shaft.

In the preferred form of servo system the servo motor driving the attenuator in the comparison beam path is a split phase induction motor the reference phase of which is operated continuously from the mains supply whilst the control phase is energised by the signal also at 50 c./s., derived from the selector network of the drawing. The A.C. generator is adjusted in the way described so that this latter signal has a 90° phase displacement with respect to the reference phase.

The invention is not solely applicable to null-balance systems, but can also be used for direct deflection instruments as hereinbefore indicated.

Instead of the circuit illustrated for converting the frequency of the signal to mains frequency, the signal may be applied to a circuit as described in our co-pending application No. 636,998/57.

The principle of the invention may be equally well applied to a circuit employing transistors in place of the thermionic values shown in FIGURE 2.

I claim:

1. Means for increasing the frequency of a first signal representing a quantity to be measured in which said first signal has a frequency bearing a fixed relation to an A.C. supply frequency (F) and is used to modulate a second signal produced by an A.C. generator driven at a speed in fixed relationship to the frequency F of the source of supply, the frequency $f_1$ of said second signal being adjusted in relation to the frequency $f_2$ of the first signal so that $f_1 \pm f_2 = F$, a selector circuit being provided to select, from the resultant modulated output, a signal of frequency equal to the supply frequency F.

2. A double beam spectrometer comprising a source of radiation, means for directing said radiation into two beam paths, one path containing a sample substance and the other path comparison means, means for focussing the radiations for each beam path alternately on the entrance slit of a monochromator, detection means for receiving radiation from said monochromator and converting same into an equivalent electrical signal, said signal having a frequency $f_2$ equal to the frequency with which a beam is focussed on said entrance slit, amplification means for amplifying said signal from the detection means, a frequency step up circuit in which said signal from the amplifier is modulated with a signal from the A.C. generator having frequency $f_1$ such that $f_1 \pm f_2 = F$, a signal of frequency F being selected by said circuit and applied to a servo system for moving an attenuator in the beam path containing the comparison means.

3. A double beam spectrometer as claimed in claim 2 in which the servo system includes a split phase induction motor a reference phase of which is operated continuously from mains supply whilst a control phase is energized by the signal from said frequency step up circuit having a frequency F equal to mains frequency and the A.C. generator is adjusted so that the latter signal has a 90° phase displacement relative to the reference phase.

References Cited in the file of this patent

UNITED STATES PATENTS

| | | |
|---|---|---|
| 1,806,199 | Hardy et al. | May 19, 1931 |
| 2,369,206 | Barnes | Feb. 13, 1945 |
| 2,459,293 | Shonnard | Jan. 18, 1949 |
| 2,519,154 | Schroeder et al. | Aug. 15, 1950 |
| 2,678,581 | Reisner | May 18, 1954 |
| 2,718,597 | Heigl et al. | Sept. 20, 1955 |
| 2,743,390 | Renfro | Apr. 24, 1956 |
| 2,750,834 | Golay | June 19, 1956 |
| 2,783,676 | Lanneau et al. | Mar. 5, 1957 |
| 2,806,148 | Barton | Sept. 10, 1957 |
| 2,817,062 | Towner | Dec. 17, 1957 |
| 2,856,811 | Kaye | Oct. 21, 1958 |